(12) United States Patent
Aas

(10) Patent No.: US 7,887,098 B2
(45) Date of Patent: Feb. 15, 2011

(54) LOCKING DEVICE FOR BUILT PIPE CONNECTIONS

(75) Inventor: Brynjulv Aas, Kristiansand (NO)

(73) Assignee: National Oil Well Norway AS, Kristiansand (NO)

( * ) Notice: Subject to any disclaimer, the term of this patent is extended or adjusted under 35 U.S.C. 154(b) by 979 days.

(21) Appl. No.: 10/572,698

(22) PCT Filed: Sep. 17, 2004

(86) PCT No.: PCT/NO2004/000277

§ 371 (c)(1),
(2), (4) Date: Mar. 20, 2006

(87) PCT Pub. No.: WO2005/026494

PCT Pub. Date: Mar. 24, 2005

(65) Prior Publication Data

US 2007/0001457 A1    Jan. 4, 2007

(30) Foreign Application Priority Data

Sep. 18, 2003 (NO) .................................. 20034158

(51) Int. Cl.
*F16L 15/00* (2006.01)
(52) U.S. Cl. .............................. 285/92; 285/81; 285/89; 285/391; 285/401
(58) Field of Classification Search .................... 285/81, 285/82, 89, 92, 333, 334, 355, 391, 401
See application file for complete search history.

(56) References Cited

U.S. PATENT DOCUMENTS

| | | | | |
|---|---|---|---|---|
| 1,934,022 A | * | 11/1933 | Wiggins | ................... 285/289.3 |
| 2,708,132 A | | 5/1955 | O'Neil | |
| 3,382,892 A | * | 5/1968 | Cerbin | .................. 137/614.02 |
| 4,512,596 A | * | 4/1985 | Obrecht | ....................... 285/81 |
| 4,655,482 A | * | 4/1987 | Myers et al. | ................... 285/81 |
| 5,785,357 A | | 7/1998 | Foster et al. | |
| 5,823,702 A | * | 10/1998 | Bynum | ....................... 403/320 |
| 6,305,724 B1 | * | 10/2001 | Sampson | ..................... 285/376 |
| 6,616,197 B2 | * | 9/2003 | Sampson | ..................... 285/376 |

FOREIGN PATENT DOCUMENTS

GB        2118659 A        11/1983

OTHER PUBLICATIONS

Norwegian Search Report dated Jul. 28, 2004 for Norwegian Patent Application No. 20034158.
International Search Report dated Dec. 30, 2004 for International Application No. PCT/NO2004/000277.

* cited by examiner

*Primary Examiner*—Aaron Dunwoody
*Assistant Examiner*—Fannie Kee
(74) *Attorney, Agent, or Firm*—Kolisch Hartwell, P.C.

(57) ABSTRACT

A locking device for locking a threaded pipe connection where two threaded connection units are screwed together. The locking device includes two locking rings which engage each other with corresponding teeth and notches on their first sides. Each of the two rings has a different number of teeth and notches on their second side. The two second sides, which face the connection units, are formed to engage a corresponding number of notches and teeth formed on the shoulder of the connection unit's opposite side, after the rings have been spread apart in an axial direction, while maintaining the engagement between the first and the second ring.

8 Claims, 8 Drawing Sheets

LOCKING DEVICE FOR BUILT PIPE CONNECTIONS

The present invention concerns a mechanical locking device for built pipe connections used on drilling rigs.

TECHNICAL BACKGROUND

When drilling, a top drive or tower drill is used as drive unit for rotation and handling of the drill string when this is vertical in the centre of the well. The tower drill was introduced on the market around 1980 to replace the Kelly and rotary table, which up to that point had been the only available drive system. The main object of the tower drill is that the momentum of rotation is provided to the drill string at the top, instead of through a rotation pipe. The system can rotate and pump drilling mud continuously during drilling due to application of hydraulic or electric motors arranged above the pipe. The tower drill is frequently used on land-based rigs. The tower drill is connected to the top of the drill string directly via standard threads used in this industry.

These connections comprise a male and a corresponding female threaded section. Both API and NC threads are used. Further specifications are available in the API standards.

Some machines utilize a torque wrench to tighten and loosen the connection between the drilling machine and drill string. For example in the following connections:

Between machinery and intermediate sub (between the tower drill and the intermediate sub/cross-over sub)
Between the intermediate sub and an internal blow out preventer (IBOP),
Between machinery and IBOP
Between IBOPs if more than one are installed, and
Between IBOP and saver sub.

As alternative to the torque wrench, the drilling machinery can be provided with a back-up grabber. In such an arrangement, the drive unit of the machinery is used as power source to provide the required torque when tightening or loosening the connections described above.

For drilling machinery provided with a back-up grabber or back-up tong, it is of importance that the connection between machinery and the elements described above remains intact when the machinery is released from the drill string. The interlocking between the parts is normally provided by a set of flanges with an internal conical slot and fitted split inner rings. When the flanges are connected by a number of bolts, the inner ring is forced towards the connection units and a locking by friction is provided. This causes a secure locking, but the installation and dismantling is time-consuming and the risk of injury is high.

BRIEF DESCRIPTION OF THE INVENTION

It is an object for the present invention to provide a mechanical locking device for threaded pipe connections in drilling rigs which offers a secure locking without the use of flange connections.

A further object of the invention is to provide a locking device which can be applied irrespective of the radial orientation of the connected pipes.

A further object of the invention is to provide a locking device which can be operated more safely and faster than the flange arrangements that are currently in use.

BRIEF DESCRIPTION OF THE FIGURES

The invention will be described in detail in a preferred embodiment with reference to the appended figures, where.

DETAILED DESCRIPTION OF THE INVENTION

Figure 1:
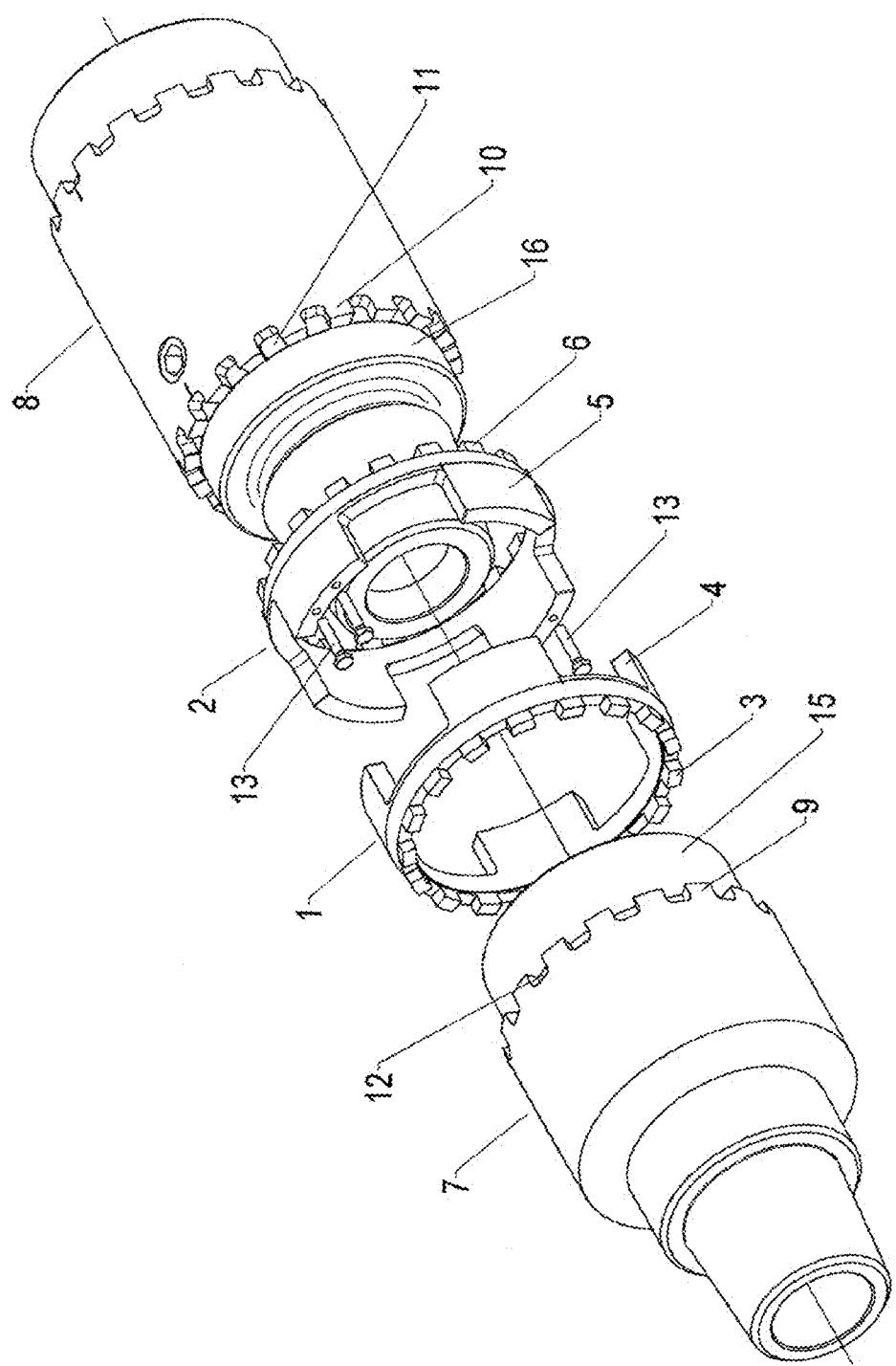
FIG. 1 is an exploded view of the locking device according to the invention.

The invention comprises a device for locking threaded pipe connections for use on drill rigs. The locking arrangement comprises a first and a second ring 1, 2 with axial teeth 3, 4, 5, 6 and connection units 7, 8 with a number of notches and teeth 9, 10, 11, 12. The locking device is intended to secure the connection further, in addition to the momentum of torque applied according to present specifications, before the rings 1, 2 are positioned and locked.

Figure 2:
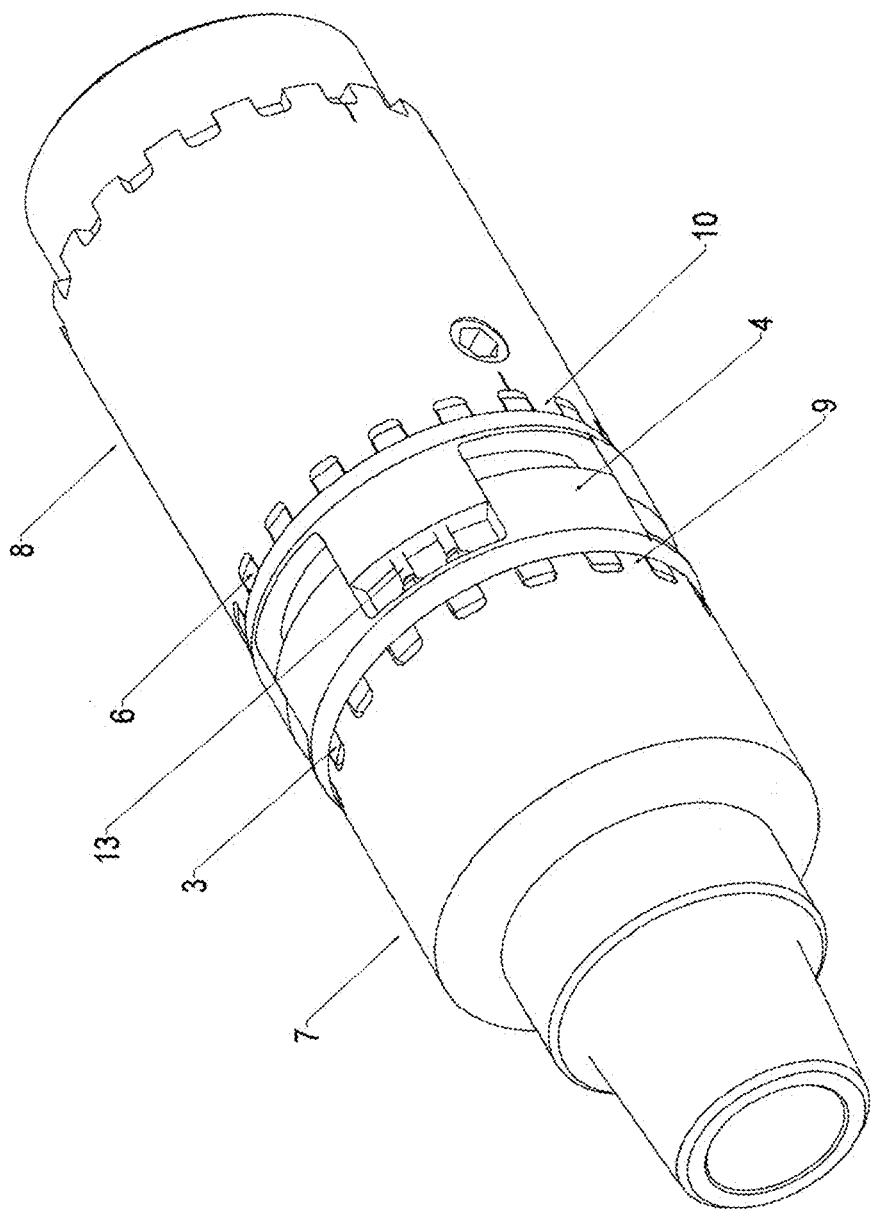
FIG. 2 is a perspective view of the locking device according to the invention.
Figure 4:
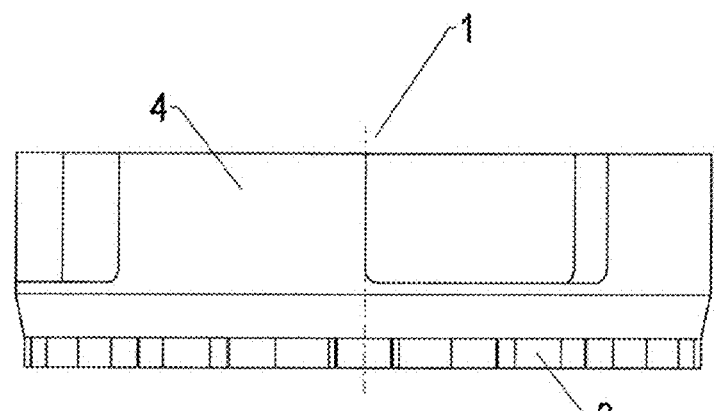
FIG. 4 is a side view of a first locking ring.
Figure 5:
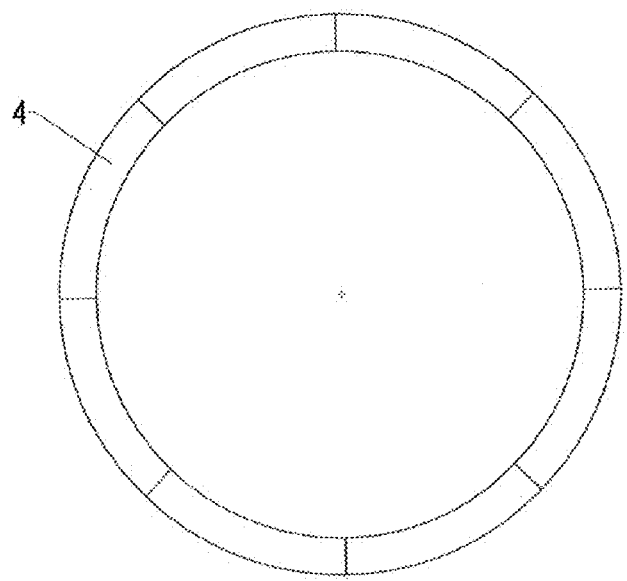
FIG. 5 is an axial side view of the ring in FIGS. 3 and 4.
Figure 6:
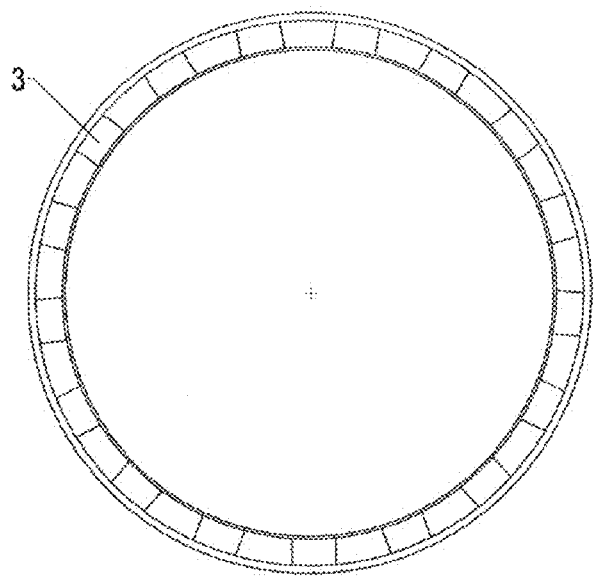
FIG. 6 is an axial side view of the ring in FIGS. 3 and 4.
Figure 14:
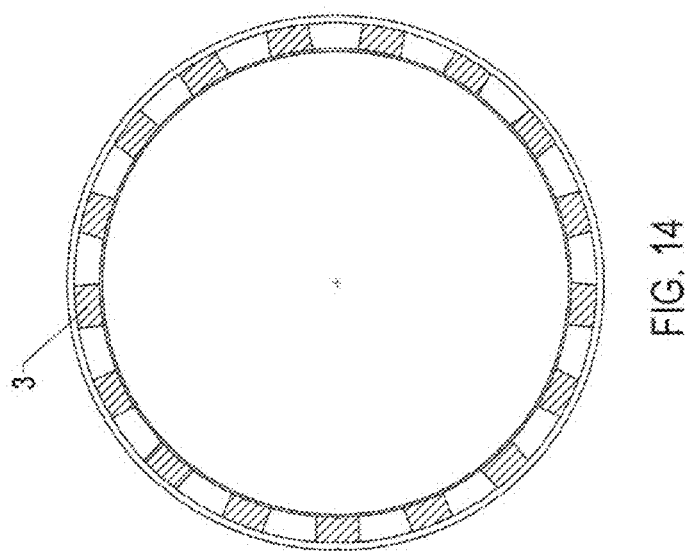
FIG. 14 is a cross-sectional view of the ring of FIG. 7 along section XIV-XIV.
Figure 7:
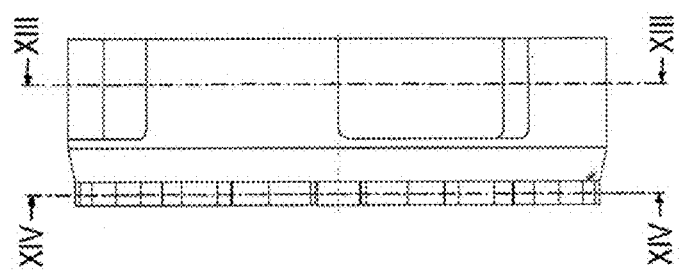
FIG. 7 is a side view of the ring in FIGS. 3 and 4, with sections XIII and XIV shown in FIGS. 13 and 14, respectively.
Figure 13:
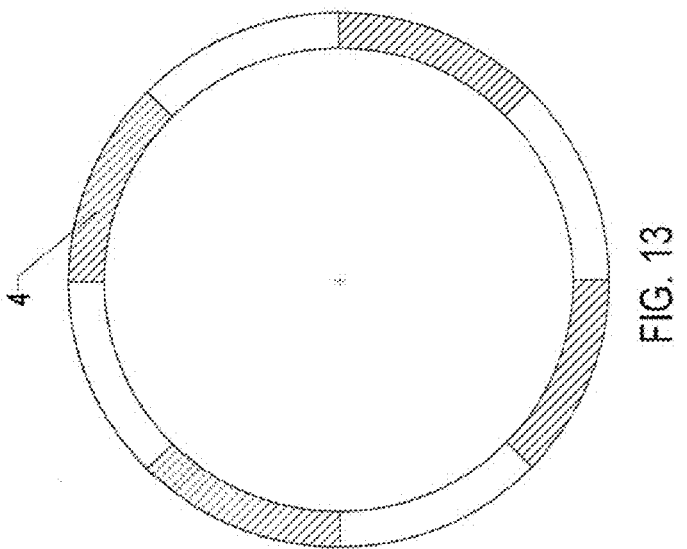
FIG. 13 is a cross-sectional view of the ring of FIG. 7 along section XIII-XIII.
Figure 8:
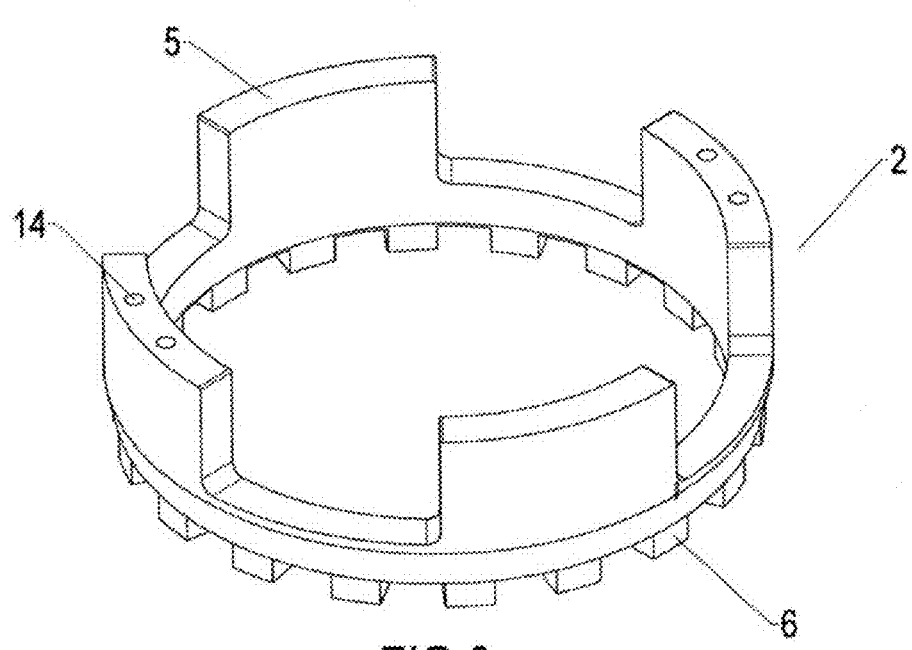
FIG. 8 is a perspective view of a second locking ring.
Figure 9:
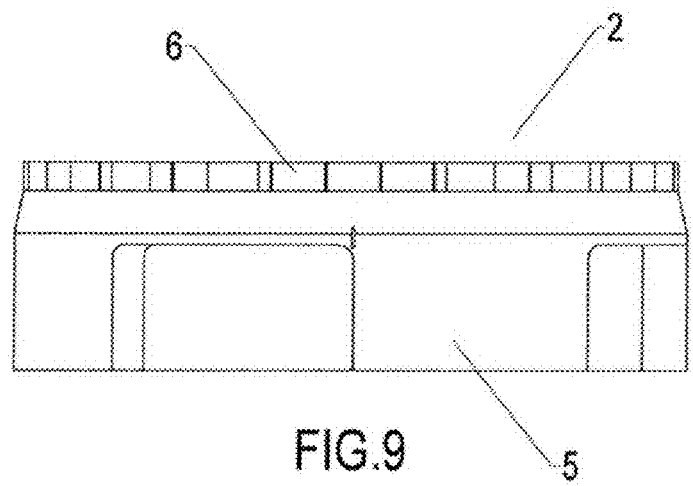
FIG. 9 is a side view of a second locking ring.
Figure 10:
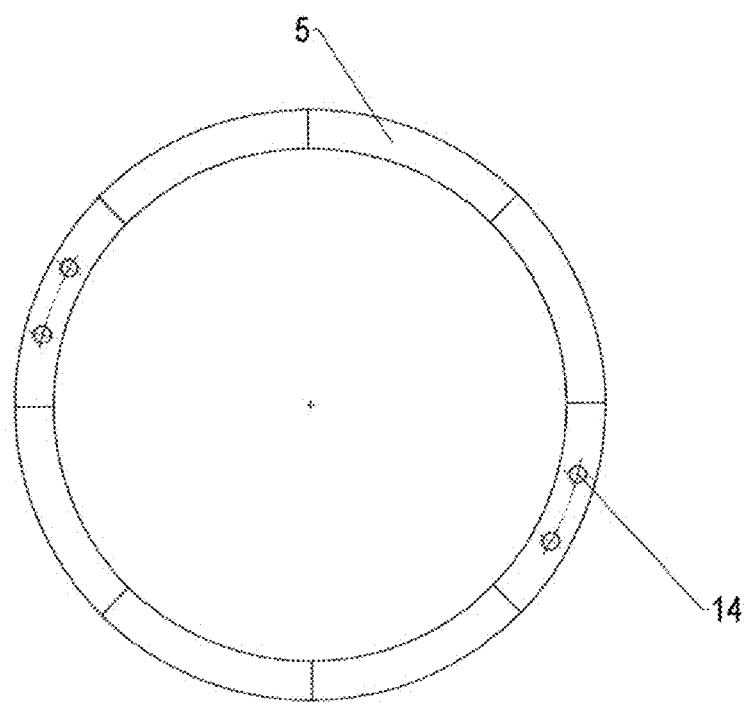
FIG. 10 is an axial side view of the ring in FIGS. 8 and 9.
Figure 11:
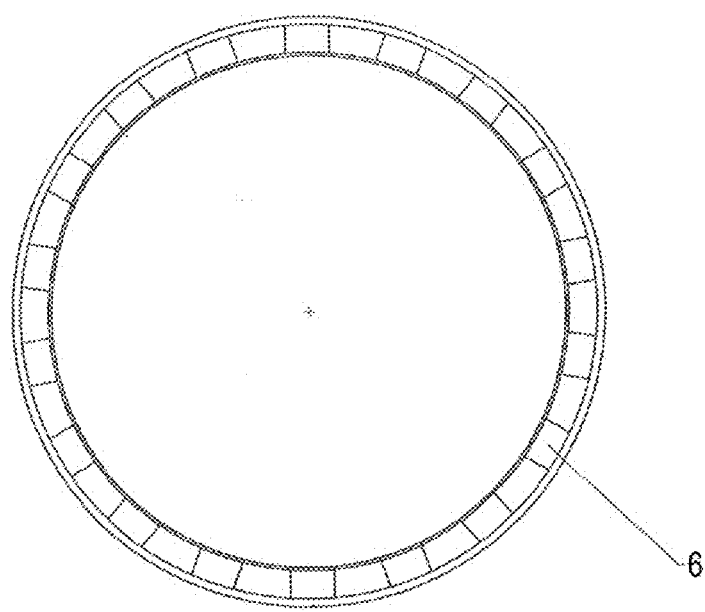
FIG. 11 is an axial side view of the ring in FIGS. 8 and 9.
Figure 16:
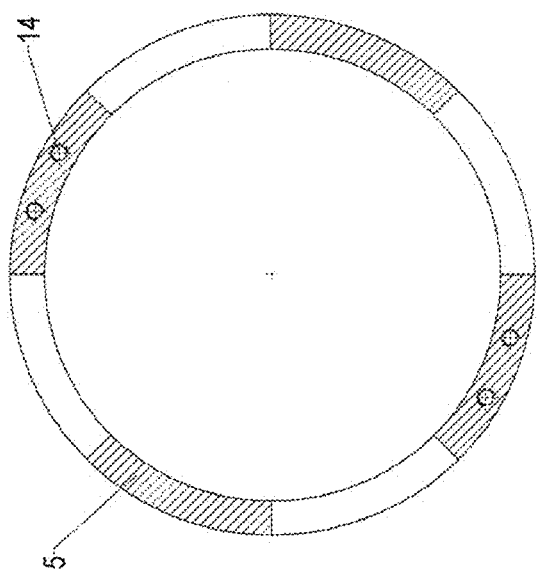
FIG. 16 is a cross-sectional view of the ring of FIG. 12 along section XVI-XVI.
Figure 12:
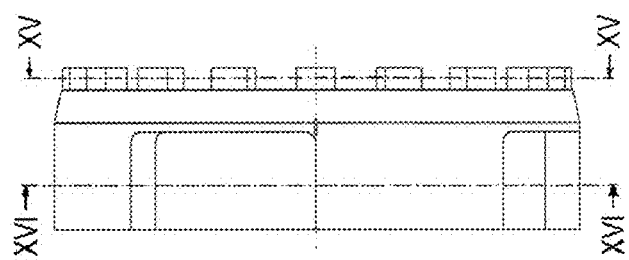
FIG. 12 is a side view of the ring in FIGS. 8 and 9, with sections XV and XVI shown in FIGS. 15 and 16, respectively.
Figure 15:
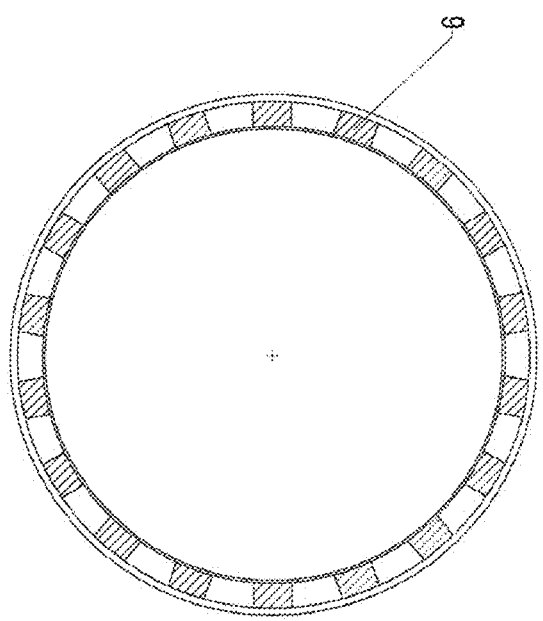
FIG. 15 is a cross-sectional view of the ring of FIG. 12 along section XV-XV.

Due to the number of teeth 3, 4, 5, 6 and the distribution of the teeth, the locking can be applied independently of the rotational position of the connection units 7, 8 with respect to each other after the threaded connection is completed. This is possible due to a different number of teeth 3, 6 on the first and second locking ring 1, 2 and their mutual positioning. The first 1 and second 2 ring have an even and odd number of teeth 3, 6, respectively, and a corresponding number of notches 12, 11 in the drilling machine/drill string connection or other connection 7, 8. In this embodiment there are 17 and 18 teeth 3, 6 on the first and second rings, respectively. The teeth 3, 6 are evenly distributed around the periphery of the rings as shown in FIGS. 2 and 4. However, the number of teeth 3, 6 may vary, as may their dimensions and distribution around the periphery. However, changing these parameters will cause a variation of the system's tolerance for rotational dislocation of the two connection units. The preferred ratios of dimension are shown in the appended figures.

The two locking rings 1, 2 in each connection engage each other via a plurality of axially oriented teeth 4, 5 on the first edge of the first 1 and second 2 locking ring, respectively. In this example there are four teeth 4, 5 on each ring 1, 2. When connecting the threaded sections, the two locking rings 1, 2 abut each other as tightly as possible with the four teeth 4, 5 in engagement in corresponding notches in the opposite ring. The locking rings 1, 2 are arranged to slide angularly and axially on shoulders 15, 16 on the connection units 7, 8. When the threaded sections are connected, the two locking rings 1, 2 are revolved on shoulders 15, 16 on the connection units to bring the teeth 3, 6 at the first 1 and second 2 rings other edge in alignment with the notches 12, 11 on the two connection units 7, 8. The rings are then spread partially apart manually, mechanically or by other means and locked by means of locking means 13, such as e.g. bolts arranged in cavities 14 in one of the locking rings 1, 2. The final rotational position of the rings 1, 2 will depend on the rotational orientation of the connection units with respect to each other. Due to the different number of teeth 3, 6 and their orientation there will always be a position where the two locking rings 1, 2 engage the notches 12, 11 in the two connection units 7, 8 simultaneously. Hence, the locking rings 1, 2 will engage each other, and the rings 1, 2 will engage the first and second connection units 7, 8, respectively. The locking rings therefore provide a rotational interlocking of the two connection units 7, 8 with respect to each other, so that they can not be screwed apart.

The two locking rings 1, 2 according to the embodiment shown in the drawings are designed as follows. The first ring 1 is provided with four teeth 4 and notches for engagement in the equally shaped teeth 5 and notches in the second ring 2. In the example the teeth 4, 5 form a 45° sector of the edge of the ring. The height of the teeth is 73 mm. The notches correspond to the teeth 4, 5 with the necessary clearance. The teeth 3, 6 on the opposite sides of the two rings 1, 2, that is on the side which will engage the connection units 7, 8, are not formed identically on the first 1 and second 2 locking ring.

Figure 3:
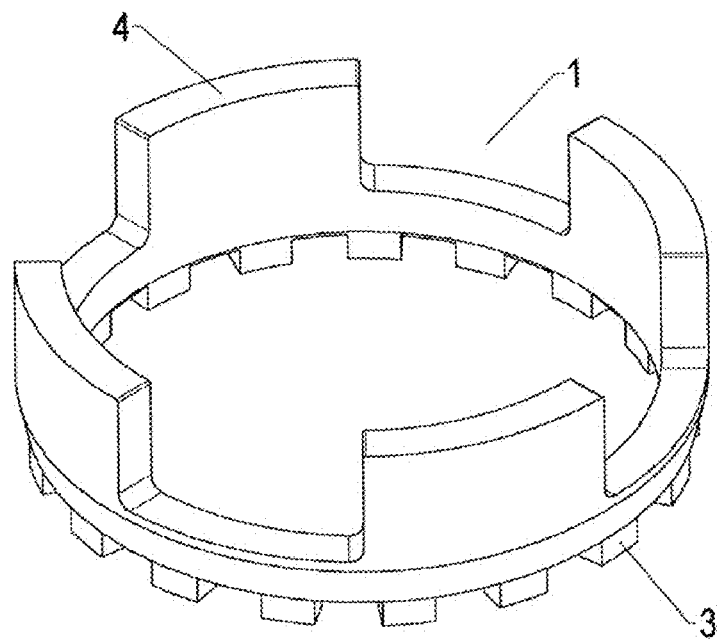
FIG. 3 is a perspective view of a first locking ring.

The first locking ring 1 is provided with an odd number of teeth 3 on the side facing the connection unit 7. In the example in FIG. 3 the number of teeth 3 is seventeen, hence, the number of notches is seventeen. One half of a tooth 3 and one half of a notch together form a 10.59° sector of the ring's edge. Each tooth 3 has a height of 10 mm, and each notch corresponds to the teeth 9 on the connection unit 7 with the necessary clearance.

The second locking ring 2 is provided with an even number of teeth 6 on the side facing the connection unit 8. In the example in FIG. 2 the number of teeth is eighteen, hence the number of notches is also eighteen. One half of a tooth 6 and one half of a notch together form a 10° sector of the ring's edge. Each tooth 6 has a height of 10 mm, and each notch corresponds to the teeth 10 on the connection unit 8 with the necessary clearance.

The locking rings 1, 2, are provided with teeth 3, 6 that have parallel flanks, and notches with slanted sides at the sides facing the connection units 7, 8. Similarly, the connect ion units 7, 8 are provided with teeth 9, 10 with slanted flanks, and notches 11, 12 with parallel sides. The teeth 3, 6, 9, 10 and the notches 11, 12 in the teeth that engage are formed to provide a sufficient clearance after engagement to absorb possible small deformations of the locking rings (1, 2).

All dimensions can be varied and must be adapted to the size of the connection units 7, 8 and to the forces acting on the locking device. Hence, all dimensions are examples only, and the invention is solely limited by the appended patent claims.

The invention claimed is:

1. A locking device for pipe connections, the locking device comprising:
   a first and a second connection unit which are threaded and include a female and a male threaded section, respectively, where the connection units are configured to be screwed together to form a pipe connection,
   a first and a second locking ring disposed between the first and second connection units and concentric with the pipe connection, each locking ring having a first and a second side; and
   an axial lock configured to prevent the first and second locking rings from moving towards each other in an axial direction when engaged;
   characterized in that the first and second side of each of the locking rings each comprise a plurality of teeth separated by intermediate notches, such that the teeth and notches on the first sides of the first and second locking rings are configured to engage each other; and the teeth and notches on the second sides of the first and second locking rings face the first and second connection units, respectively, and are configured to engage a corresponding number of notches and teeth formed on a shoulder of a facing edge of their corresponding connection units, the number of teeth and notches on the second side of the first ring being different from the number of teeth and notches on the second side of the second ring;
   so that upon screwing together of the first and second connection units, the first and second locking rings may be revolved together to a position in which the first and second locking rings may be spread partially apart in an axial direction to engage the second sides of the locking rings with their corresponding connection units and, at the same time, maintain the mutual engagement between the first sides of the first and second locking rings, so that when the axial lock is engaged to maintain the separation between the first and second locking rings, rotation between the first and second connection units is prevented.

2. The locking device according to claim 1, characterized in that the first and second locking rings are arranged to slide rotationally and axially on the connection units while remaining disposed concentrically on the pipe connection.

3. The locking device according to claim 1, characterized in that the first and second locking rings are provided with teeth that have parallel flanks, and notches with slanted sides at the sides facing the connection units.

4. The locking device according to claim 1, characterized in that the connection units are provided with teeth with slanted flanks, and notches with parallel sides.

5. The locking device according to claim 1, characterized in that the teeth and the notches in which the teeth engage are formed to provide a sufficient clearance after engagement to absorb possible small deformations of the locking rings.

6. The locking device according to claim 1, wherein the first locking ring has an even number of both teeth and notches and the second locking ring has an odd number of both teeth and notches.

7. A method for locking threaded pipe connection units utilizing the locking device according to claim 1, characterized in the following steps:
   screwing the threaded connection units together;
   revolving the first and second locking rings simultaneously to bring the teeth and notches on the second sides of the first and second locking rings into alignment with the corresponding notches and teeth on the shoulders of their corresponding connection units;
   spreading the first and second locking rings partially apart in an axial direction;
   engaging the teeth and notches of the second sides of the first and second locking rings with their corresponding connection units while maintaining the mutual engagement between the teeth and notches of the first sides of the first and second locking rings; and
   engaging the axial lock, thereby locking the connection units with respect to a rotation between the first and second connection units.

8. The method according to claim 7, characterized in that the first and second locking rings are manually spread apart in the axial direction, and that engaging the axial lock includes extending one or more locking bolts from one locking ring to the other.

* * * * *